US005559495A

United States Patent [19]

Cochran

[11] Patent Number: 5,559,495

[45] Date of Patent: Sep. 24, 1996

[54] SLEEP-PREVENTING ALARM OPERABLE IN CONJUNCTION WITH A MOTOR VEHICLE

[76] Inventor: Danny M. Cochran, 109 NW. Rock Creek Cir., Ankeny, Iowa 50021

[21] Appl. No.: 373,760

[22] Filed: Jan. 17, 1995

[51] Int. Cl.[6] .................... B60Q 5/00

[52] U.S. Cl. .................... 340/457; 340/309.15; 340/575; 340/576; 368/109; 368/250; 368/263

[58] Field of Search .................... 340/457, 575, 340/945, 576, 309.15; 368/107-109, 248, 250, 251, 262, 263

[56] References Cited

U.S. PATENT DOCUMENTS

| | | | |
|---|---|---|---|
| 3,636,549 | 1/1972 | Berman et al. | 340/309.15 |
| 3,678,494 | 7/1972 | Setser | 340/575 |
| 3,715,897 | 2/1973 | Cielaszyk | 368/248 |
| 3,903,514 | 9/1975 | Mazzola | 340/575 |
| 3,906,478 | 9/1975 | Smey | 340/575 |
| 4,219,800 | 8/1980 | LeViness | 340/457 |
| 4,258,354 | 3/1981 | Carmon et al. | 340/309.15 |
| 4,259,665 | 3/1981 | Manning | 340/575 |
| 4,305,062 | 12/1981 | Hogg, Jr. et al. | 340/309.15 |
| 4,857,030 | 10/1989 | Chiu | 340/575 |
| 4,987,403 | 1/1991 | Apfel | 340/457 |
| 5,012,226 | 4/1991 | Love | 340/309.15 |

*Primary Examiner*—John K. Peng
*Assistant Examiner*—Daniel J. Wu

[57] ABSTRACT

A sleep-preventing alarm including timer circuitry for selectively transmitting a periodic indicator signal upon completion of a characteristic time interval in one of a number of modes of operation; a lamp for transmitting a visual alert upon receipt of a lamp indication signal; a speaker for transmitting an audible alert upon receipt of a speaker activation signal; indicator circuitry coupled to the timer circuitry, the speaker, and the lamp and with the indicator circuitry generating both a periodic lamp indication signal for a pre-determined amount of time and a periodic speaker activation signal for a pre-determined amount of time upon receipt of the indicator signal from the timer circuitry; keypad circuitry for placing the timing circuitry in one of the modes of operation; and a power cable for providing electrical energy to the circuitry for operation.

8 Claims, 4 Drawing Sheets

SLEEP-PREVENTING ALARM OPERABLE IN CONJUNCTION WITH A MOTOR VEHICLE

BACKGROUND OF THE INVENTION

1. Field of the Invention

The present invention relates to a sleep-preventing alarm operable in conjunction with a motor vehicle and more particularly pertains to providing a periodic visual and audible alert to thereby preclude a driver of a motor vehicle from falling asleep with a sleep-preventing alarm operable in conjunction with a motor vehicle.

2. Description of the Prior Art

The use of sleep prevention alarms is known in the prior art. More specifically, sleep prevention alarms heretofore devised and utilized for the purpose of preventing a user from falling asleep are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,678,494 to Setser discloses a sleep sensing apparatus for use on automotive vehicles. U.S. Pat. No. 3,715,879 to Cielaszyk discloses an intermittently repeating alarm mechanism. U.S. Pat. No. 3,903,514 to Mazzola discloses a stay-awake alarm. U.S. Pat. No. 3,906,478 to Smey discloses a sleep preventing device. U.S. Pat. No. 4,259,665 to Manning discloses a driver's sleep or fatigue alarm. U.S. Pat. No. 4,875,030 to Chiu discloses a sleep-preventing alarm device.

While these devices fulfill their respective, particular objective and requirements, the aforementioned patents do not describe a sleep-preventing alarm operable in conjunction with a motor vehicle that allows a periodic visual and audible alert to be generated based upon the discretion of a driver.

In this respect, the sleep-preventing alarm operable in conjunction with a motor vehicle according to the present invention substantially departs from the conventional concepts and designs of the prior art, and in doing so provides an apparatus primarily developed for the purpose of providing a periodic visual and audible alert to thereby preclude a driver of a motor vehicle from falling asleep.

Therefore, it can be appreciated that there exists a continuing need for new and improved sleep-preventing alarm operable in conjunction with a motor vehicle which can be used for providing a periodic visual and audible alert to thereby preclude a driver of a motor vehicle from falling asleep. In this regard, the present invention substantially fulfills this need.

SUMMARY OF THE INVENTION

In the view of the foregoing disadvantages inherent in the known types of sleep prevention alarms now present in the prior art, the present invention provides an improved sleep-preventing alarm operable in conjunction with a motor vehicle. As such, the general purpose of the present invention, which will be described subsequently in greater detail, is to provide a new and improved sleep-preventing alarm operable in conjunction with a motor vehicle and method which has all the advantages of the prior art and none of the disadvantages.

To attain this, the present invention essentially comprises, in combination, a hollow rigid housing having a top wall, a bottom wall, and a periphery interconnecting the top wall with the bottom wall formed of an upstanding oval front face, an upstanding oval rear face, and a pair of opposed and curved side walls. A rigid mounting bracket is included and has a planar central portion removably coupled to the housing and two L-shaped feet extended downwards therefrom. Each foot of the housing further includes a pair of mounting holes formed thereon and with each mounting hole adapted to receive a bolt for coupling the mounting bracket to a vehicle. Each foot of the housing additionally includes a layer of adhesive applied thereto between the mounting holes. The layer of adhesive is covered with a peel-off paper backing. The backing is removed for adhering the feet to a surface of a vehicle.

Timer circuitry is included disposed within the housing. The timer circuitry selectively transmits a periodic indicator signal upon completion of a 30-second interval in a first mode of operation, a 60-second time interval in a second mode of operation, a 90-second interval in a third mode of operation, a 120-second interval in a fourth mode of operation, a 150-second interval in a fifth mode of operation, and a 180-second interval in a sixth mode of operation. A lamp is included and extended through the front face of the housing for transmitting a visual alert upon receipt of a lamp indication signal. A speaker is included and extended from the top wall of the housing for transmitting an audible alert upon receipt of a speaker activation signal.

Indicator circuitry is included and coupled to the timer circuitry, the speaker, and the lamp and with the indicator circuitry generating both a periodic lamp indication signal for a pre-determined amount of time and a periodic speaker activation signal with a characteristic strength and frequency for a pre-determined amount of time upon receipt of the indicator signal from the timer circuitry. The indicator circuitry further includes a head-phone jack coupled thereto. The head-phone jack is couplable with an external head-phone set.

Keypad circuitry is also included. The keypad circuitry is extended from the housing and coupled to the timer circuitry and indicator circuitry. The keypad circuitry includes a first, a second, a third, a fourth, a fifth, and a sixth back-lit momentary pushbutton switch. The pushbutton switches are arranged in a horizontal sequential fashion to define a timing bar. The first pushbutton is depressible for placing the timing circuitry in a first mode of operation. The second pushbutton is depressible for placing the timing circuitry in a second mode of operation. The third pushbutton is depressible for placing the timing circuitry in a third mode of operation. The fourth pushbutton is depressible for placing the timing circuitry in a fourth mode of operation. The fifth pushbutton is depressible for placing the timing circuitry in a fifth mode of operation. Lastly, the sixth pushbutton is depressible for placing the timing circuitry in a sixth mode of operation. The keypad circuitry further includes a volume control dial and a tone control dial extended from the front face of the housing. The volume control dial is rotatable for adjusting the strength of the speaker activation signal and thereby controlling the volume of the audible alert transmitted from the speaker. The tone control dial is rotatable for adjusting the frequency of the speaker activation signal and thereby controlling the pitch of the audible alert signal transmited from the speaker.

A rotatable spring-loaded spool is included and secured within the housing. The spool includes an actuateable spool switch engaged therewith. The spool is manually rotatable in one direction when a torquing force is applied thereto and automatically rotatable in an opposite direction upon activation of the switch. Lastly, a power cable is included and has a proximal terminal end coupled to the timer circuitry, indicator circuitry, and keypad circuitry and a distal plug end couplable with a lighter socket of a vehicle for receiving electrical energy therefrom for circuitry operation. The power cable is positionable in a wrapped configuration around the spool and selectively manually payable therefrom and automatically retractable thereon upon actuation of the spool switch.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved sleep-preventing alarm operable in conjunction with a motor vehicle which has all the advantages of the prior art sleep prevention alarms and none of the disadvantages.

It is another object of the present invention to provide a new and improved sleep-preventing alarm operable in conjunction with a motor vehicle which may be easily and efficiently manufactured and marketed.

It is a further object of the present invention to provide a new and improved sleep-preventing alarm operable in conjunction with a motor vehicle which is of durable and reliable construction.

An even further object of the present invention is to provide a new and improved sleep-preventing alarm operable in conjunction with a motor vehicle which is susceptible of a low cost of manufacture with regard to both materials and labor, and which accordingly is then susceptible of low prices of sale to the consuming public, thereby making such a sleep-preventing alarm operable in conjunction with a motor vehicle economically available to the buying public.

Still yet another object of the present invention is to provide a new and improved sleep-preventing alarm operable in conjunction with a motor vehicle which provides in the apparatuses and methods of the prior art some of the advantages thereof, while simultaneously overcoming some of the disadvantages normally associated therewith.

Even still another object of the present invention is to provide a new and improved sleep-preventing alarm operable in conjunction with a motor vehicle for providing a periodic visual and audible alert to thereby preclude a driver of a motor vehicle from falling asleep.

Lastly, it is an object of the present invention to provide a new and improved sleep-preventing alarm operable in conjunction with a motor vehicle comprising a hollow rigid housing; a coupling mechanism for securing the housing to a motor vehicle; timer circuitry disposed within the housing for selectively transmitting a periodic indicator signal upon completion of a characteristic time interval in one of a number of successive modes of operation; a lamp extended from housing for transmitting a visual alert upon receipt of a lamp indication signal; a speaker extended from the housing for transmitting an audible alert upon receipt of a speaker activation signal; indicator circuitry coupled to the timer circuitry, the speaker, and the lamp and with the indicator circuitry generating both a periodic lamp indication signal for a pre-determined amount of time and a periodic speaker activation signal for a pre-determined amount of time upon receipt of the indicator signal from the timer circuitry; keypad circuitry extended from the housing and coupled to the timer circuitry and indicator circuitry, the keypad circuitry including a plurality of switches with each switch selectively actuateable for placing the timing circuitry in one of the successive modes of operation; and a power cable having a proximal end coupled to the timer circuitry, indicator circuitry, and keypad circuity and a distal end coupled with an external power supply for providing electrical energy to the circuitry for operation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
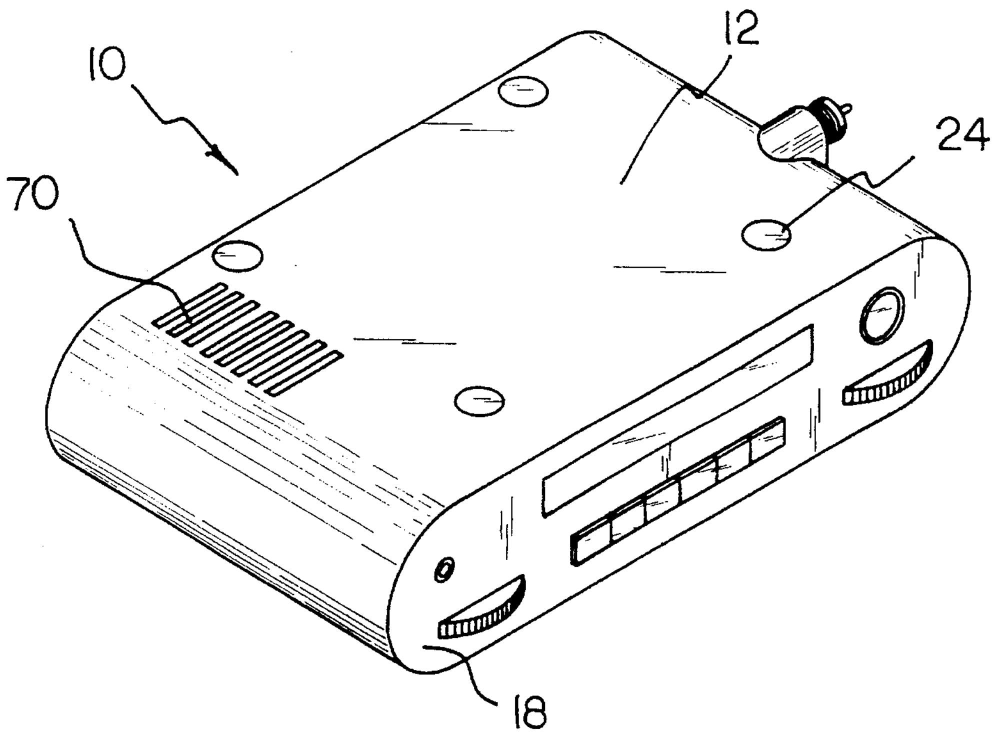
FIG. 1 is a perspective view of the preferred embodiment constructed in accordance with the principles of the present invention.

With reference now to the drawings, and in particular, to FIG. 1 thereof, the preferred embodiment of the new and improved sleep-preventing alarm operable in conjunction with a motor vehicle embodying the principles and concepts of the present invention and generally designated by the reference number 10 will be described.

The present invention is comprised of a plurality of components. In their broadest context, such components include a housing, controlling circuitry, and an alert mechanism. Such components are individually configured and correlated with respect to each other to provide the intended function of generating a periodic adjustable visual and audible alert to preclude a driver of a motor vehicle from falling asleep.

Figure 5:
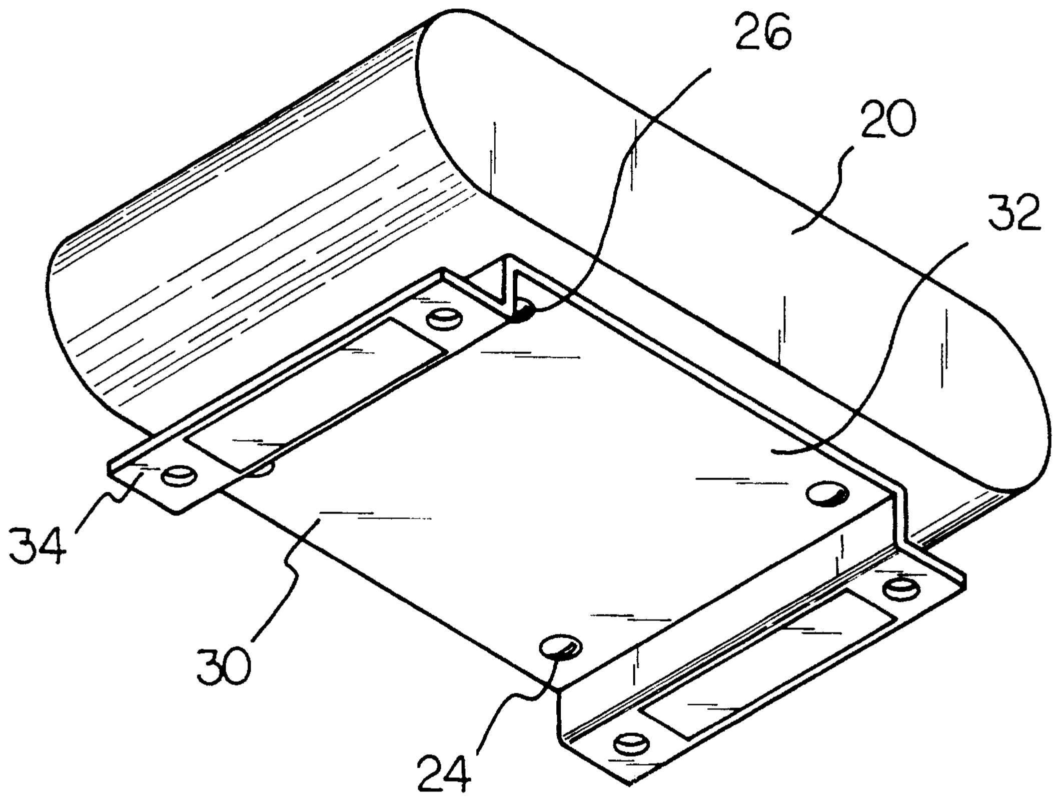
FIG. 5 is a bottom perspective view of the preferred embodiment of the present invention.

Specifically, the present invention includes a housing 12. The housing is hollow and formed of a rigid material such as metal, plastic, or the like. The housing has a planar horizontal top wall 14, a planar horizontal bottom wall 16, and a periphery interconnecting the top wall with the bottom wall. The periphery of the housing is formed of an upstanding planar oval front face 18, an upstanding planar oval rear face 20, and a pair of opposed and outwardly curved side walls 22. Also included are mounting holes 24 on the top wall as well as the bottom wall as shown in FIG. 1 and FIG. 5. Removable elastomeric mounting plugs 26 are removably secured within the mounting holes.

Figure 6:
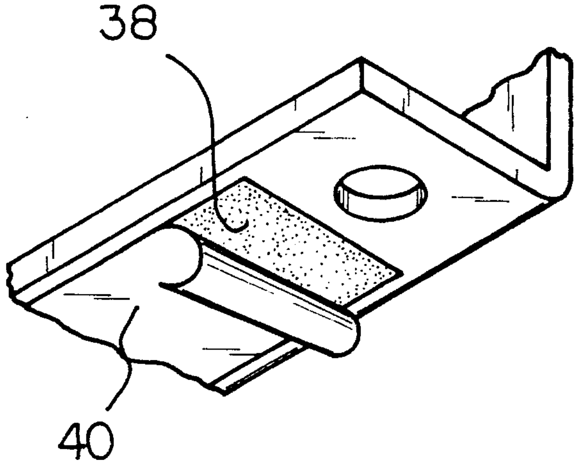
FIG. 6 is an enlarged fragmentary view of one of the feet of the mounting bracket of the present invention.

Also provided is a rigid mounting bracket 30 as shown in FIG. 5. The mounting bracket is formed of metal, plastic, or the like. The mounting bracket includes a rectangular planar horizontal central portion 32 with a plurality of mounting holes 24 formed thereon. The mounting holes on the central portion are alignable with the mounting holes on either the top wall or the bottom wall of the housing. The central portion is removably coupled to either the top wall or the bottom wall of the housing through the use of mounting plugs 26. This configuration enables the position of the mounting bracket to be readily modified with repect to the housing for its securement to a vehicle. As depicted in FIG. 5, the central portion of the mounting bracket is shown secured to the bottom wall of the housing. The mounting bracket also includes two L-shaped feet 34 extended downwards therefrom. Each foot further includes a pair of mounting holes 36 formed thereon. Each mounting hole is adapted to receive an external bolt or screw for coupling the bracket to a vehicle. Furthermore, as shown in FIG. 6, each foot additionally includes a thin layer of adhesive 38 applied thereto between the mounting holes. This layer of adhesive is covered with a removable peel-off paper backing 40. The paper backing is removed for adhering the feet to a surface of a vehicle. Thus, either the mounting holes, the layer of adhesive, or the combination thereof utilized may be utilized for securing the mounting bracket with housing to a vehicle.

Figure 7:
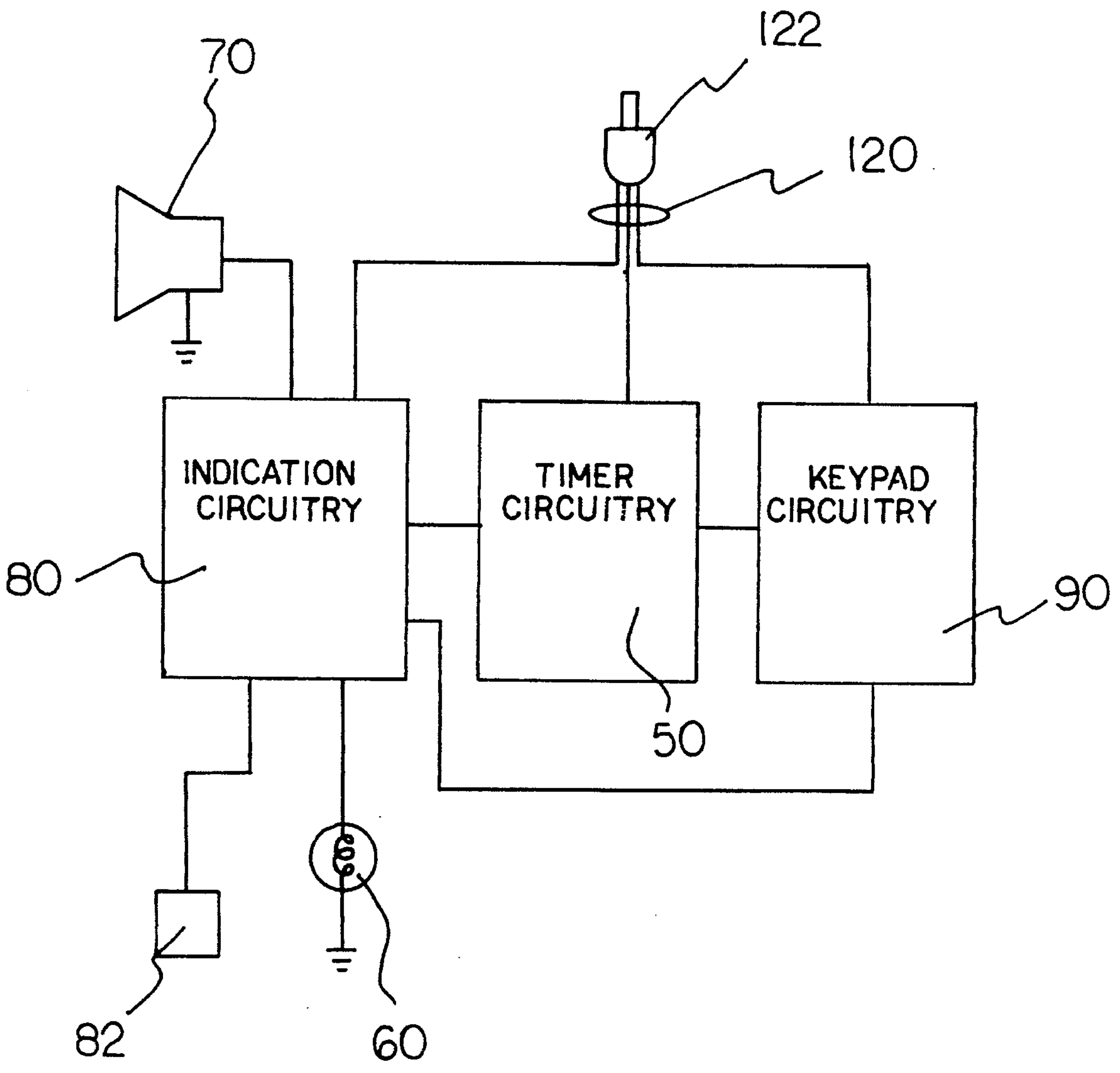
FIG. 7 is a functional block diagram of the present invention.

Timer circuitry 50 is disposed within the housing 12. As shown in FIG. 7, the timing circuitry is adapted to transmit a periodic indication signal upon every subsequent completion of a characteristic time interval in one of a number of modes of operation. The present invention employs six modes of operation. A 30-second characteristic time interval is used in a first mode of operation. A 60-second characteristic time interval is used in a second mode of operation. A 90-second characteristic time interval is used in a third mode of operation. A 120-second characteristic time interval is used in a fourth mode of operation. A 150-second characteristic time interval is used in a fifth mode of operation. Lastly, a 180-second characteristic time interval is used in a sixth mode of operation. The timer circuitry is formed of conventional and commercially available electrical components and integrated circuits.

Also provided is a lamp 60. The lamp is extended through the front face 18 of the housing. The lamp transmits a visual alert upon receipt of a lamp indication signal. A conventional light-emitting diode or an incandescent bulb may be utilized in the preferred embodiment of the present invention.

A speaker 70 is also included. The speaker is extended from the top wall 14 of the housing. The speaker transmits an audible alert upon receipt of a speaker activation signal. The speaker is conventional in design and commercially available.

Indicator circuitry 80 is coupled to the timer circuitry 50, the speaker 70, and the lamp 60. The indicator circuitry transmits a periodic lamp indicator signal for a first predetermined amount of time and a speaker activaton signal for a second pre-determined amount of time. The speaker activation signal has a characteristic strength and frequency that is adjustable. Both the indicator signal and speaker activation signal are transmitted upon receipt of the indicator signal from the timer circuitry 50. The indicator circuitry is conventional in design and formed of commercially available electrical components. The indicator circuitry further includes a head-phone jack 82 coupled thereto. The headphone jack is coupleable with an external head-phone set for use.

Figure 2:
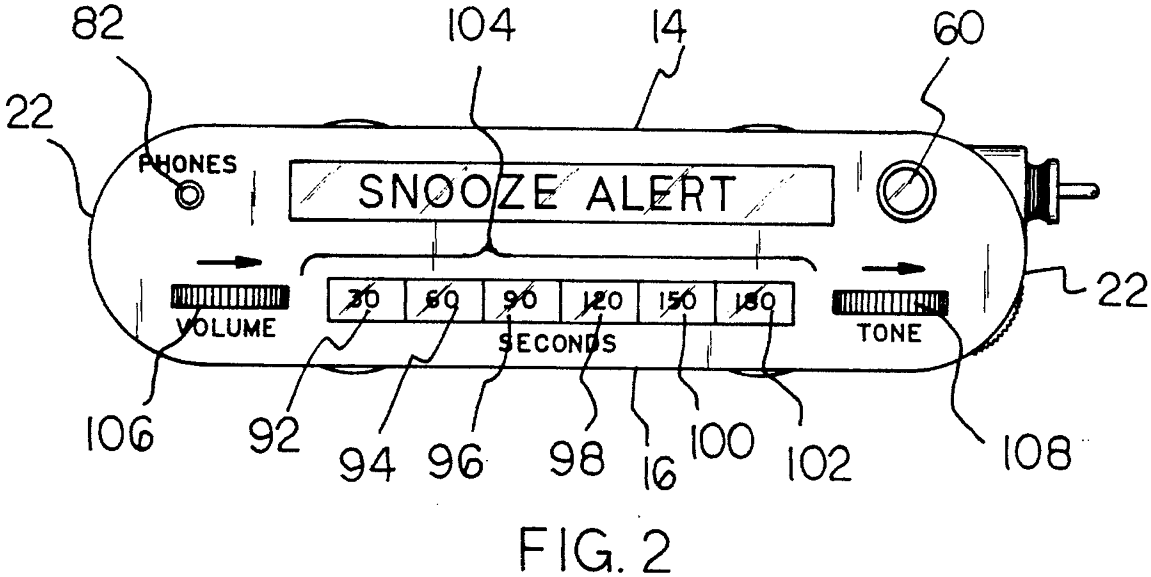
FIG. 2 is a side-elevational view of the preferred embodiment of the present invention.

To allow user actuation and programming of the present invention, keypad circuitry 90 is provided. The keypad circuitry is extended from the housing as shown in FIG. 2. The keypad circuitry is coupled to the timer circuitry 50 and indicator circuitry 80 as shown in FIG. 7. The keypad circuitry includes a first momentary pushbutton switch 92, a second momentary pushbutton switch 94, a third momentary pushbutton switch 96, a fourth momentary pushbutton switch 98, a fifth momentary pushbutton switch 100, and a sixth momentary pushbutton switch 102. The pushbutton switches are generally rectangular in shape and arranged in sequential horizontal fashion to define a timing bar 104 as shown in FIG. 2. The first pushbutton is depressible for placing the timing circuitry in a first mode of operation. The second pushbutton is depressible for placing the timing circuitry in a second mode of operation. The third pushbutton is depressible for placing the timing circuitry in a third mode of operation. The fourth pushbutton is depressible for placing the timing circuitry in a fourth mode of operation. The fifth pushbutton is depressible for placing the timing circuitry in a fifth mode of operation. Lastly, the sixth pushbutton is depressible for placing the timing circuitry in a sixth mode of operation.

The keypad circuitry further includes a volume control dial 106 and a tone control dial 108 as shown in FIGS. 1 and 2. The dials are extended from the front face of the housing. The volume control dial is rotatable for adjusting the strength of the speaker activation signal and thereby controls the volume of the audible alert transmitted from the speaker. The tone control dial is rotatable for adjusting the frequency of the speaker activation signal and thereby controls the pitch of the audible alert signal transmitted from the speaker.

Figure 3:
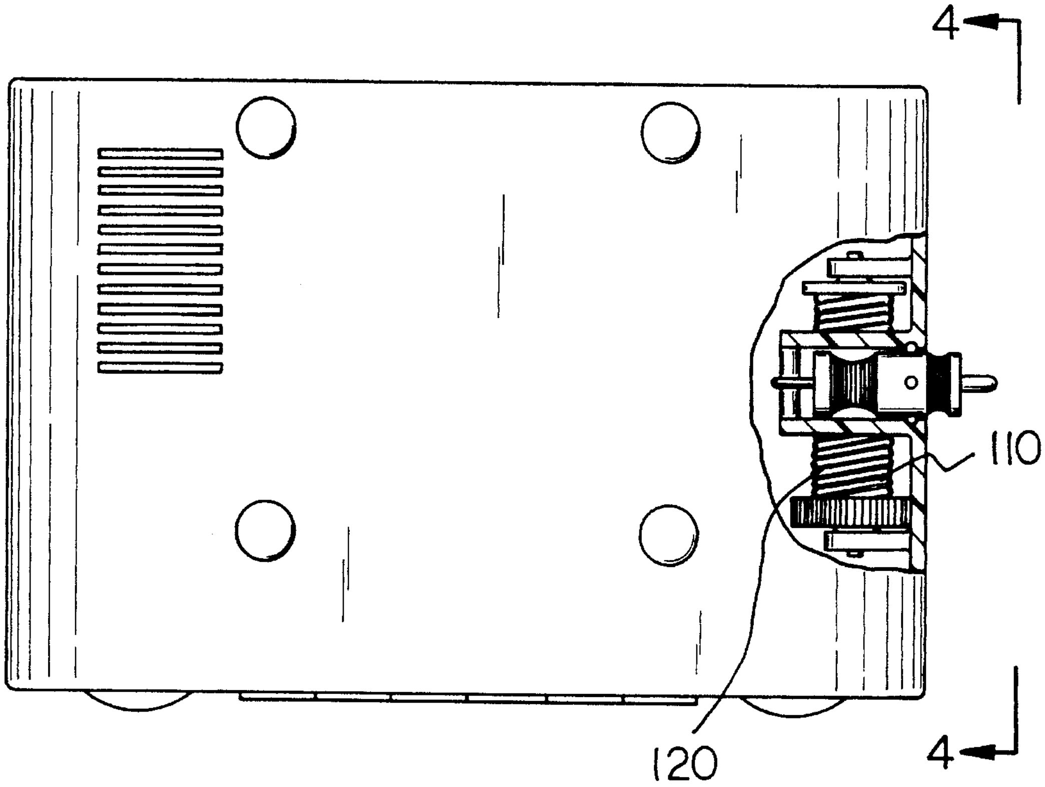
FIG. 3 is a rear plan view of the present invention with a portion of the container removed for depicting the spool and cable.
Figure 4:
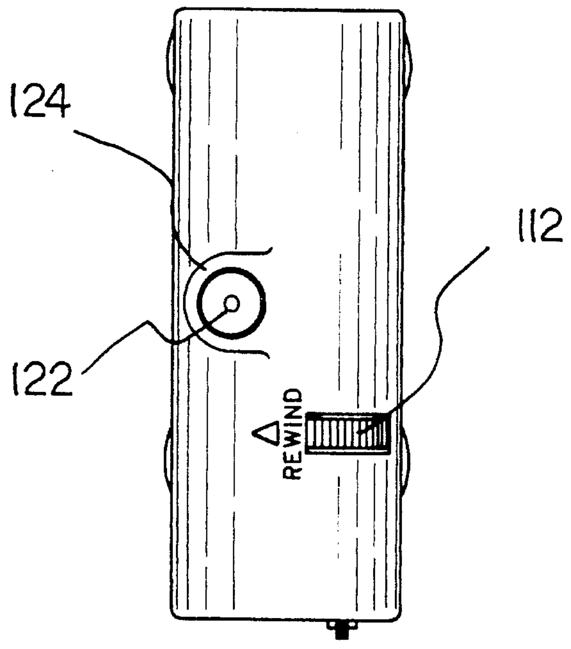
FIG. 4 is a view of the present invention taken along the line 4—4 of FIG. 3.

As best illustrated in FIG. 3, a rotatable spring-loaded spool 110 is secured within the housing. The spool includes an actuated spool switch 112 engaged therewith as shown in FIG. 4. The spool is manually rotatable in one direction when a torquing force is applied thereto for biasing its spring. The spool is automatically rotatable in an opposite direction upon activation of the spool switch and thereby allows the spring to be placed in an unbiased position.

A power cable 120 is included for providing electrical energy to the timer circuitry 50, indicator circuitry 80, and keypad circuitry 90 for operation. The power cable has a distal plug end 122. The plug end is coupleable with a lighter socket of a vehicle for receiving electrical energy therefrom. The power cable also has a proximal terminal end coupled to the circuitry as shown in FIG. 7. As best illustrated in FIG. 3, the power cable is positioned in a wrapped configuration around the spool. It is selectively and manually payable from the spool and automatically retractable thereon when the spool switch 112 is engaged. When the cable is retracted, its plug end is positioned in a tubular seat 124 integral with and extended from the housing. When the cable is retracted, the present invention is placed in a compact configuration for allowing its ready transport from one location to another.

The present invention provides a visual and audible indication for preventing a driver from falling asleep while driving. Almost all fatigued drivers initially fight off sleep while trying to drive; the present invention would thus allow a driver's attention level to be maintained by periodically generating a visual and audible alert for a pre-determined time. The driver may selectively increase or decrease the alert time by depressing one of the switches on the timing bar. The present invention can preclude many motor vehicle accidents from occurring and thus save lives.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A sleep-preventing alarm operable in conjunction with a motor vehicle for providing a periodic visual and audible alert to thereby preclude a driver of a motor vehicle from falling asleep comprising, in combination:

a hollow rigid housing having a top wall, a bottom wall, and a periphery interconnecting the top wall with the bottom wall formed of an upstanding oval front face, an upstanding oval rear face, and a pair of opposed and curved side walls;

a rigid mounting bracket having a planar central portion removably coupled to the housing and two L-shaped feet extended downwards therefrom, each foot further having a pair of mounting holes formed thereon and with each mounting hole adapted to receive a bolt for coupling the mounting bracket to a vehicle, each foot additionally having a layer of adhesive applied thereto between the mounting holes and covered with a peel-off paper backing and with the backing removed for adhering the feet to a surface of a vehicle;

timer circuitry disposed within the housing for transmitting a periodic indicator signal upon completion one of a 30-second interval in a first mode of operation, a 60-second time interval in a second mode of operation, a 90-second interval in a third mode of operation, a 120-second interval in a fourth mode of operation, a 150-second interval in a fifth mode of operation, and a 180-second interval in a sixth mode of operation;

a lamp extended through the front face of the housing for transmitting a visual alert upon receipt of a lamp indication signal;

a speaker extended from the top wall of the housing for transmitting an audible alert upon receipt of a speaker activation signal;

indicator circuitry coupled to the timer circuitry, the speaker, and the lamp and with the indicator circuitry generating both a periodic lamp indication signal for a pre-determined amount of time and a periodic speaker activation signal with a characteristic strength and frequency for a pre-determined amount of time upon receipt of the indicator signal from the timer circuitry, the indicator circuitry further including a head-phone jack coupled thereto and with the head-phone jack couplable with an external head-phone set;

keypad circuitry extended from the housing and coupled to the timer circuitry and indicator circuitry, the keypad circuitry including a first, a second, a third, a fourth, a fifth, and a sixth back-lit momentary pushbutton switch and with the pushbutton switches arranged in a horizontal sequential fashion to define a timing bar, the first pushbutton depressible for placing the timing circuitry in a first mode of operation, the second pushbutton depressible for placing the timing circuitry in a second mode of operation, the third pushbutton depressible for placing the timing circuitry in a third mode of operation, the fourth pushbutton depressible for placing the timing circuitry in a fourth mode of operation, the fifth pushbutton depressible for placing the timing circuitry in a fifth mode of operation, and the sixth pushbutton depressible for placing the timing circuitry in a sixth mode of operation, the keypad circuitry further including a volume control dial and a tone control dial extended from the front face of the housing with the volume control dial rotatable for adjusting the strength of the speaker activation signal and thereby controlling the volume of the audible alert transmitted from the speaker and with the tone control dial rotatable for adjusting the frequency of the speaker activation signal and thereby controlling the pitch of the audible alert signal transmitted from the speaker;

a rotatable spring-loaded spool secured within the housing and including an actuateable spool switch engaged therewith and with the spool manually rotatable in one direction when a torquing force is applied thereto and automatically rotatable in an opposite direction upon activation of the switch; and a power cable having a proximal terminal end coupled to the timer circuitry, indicator circuitry, and keypad circuitry and a distal plug end couplable with a lighter socket of a vehicle for receiving electrical energy therefrom for circuitry operation, the power cable positioned in a wrapped configuration around the spool and selectively manually payable therefrom and automatically retractable thereon.

2. A sleep-preventing alarm comprising:

a hollow rigid housing;

a coupling mechanism for securing the housing to a motor vehicle;

timer circuitry disposed within the housing for selectively transmitting a periodic indicator signal upon completion of a characteristic time interval in one of a number of successive modes of operation;

a lamp extended from housing for transmitting a visual alert upon receipt of a lamp indication signal;

a speaker extended from the housing for transmitting an audible alert upon receipt of a speaker activation signal;

indicator circuitry coupled to the timer circuitry, the speaker, and the lamp and with the indicator circuitry generating both a periodic lamp indication signal for a pre-determined amount of time and a periodic speaker activation signal for a pre-determined amount of time upon receipt of the indicator signal from the timer circuitry, wherein the indicator circuitry further includes a head-phone jack coupled thereto and with the head-phone jack coupleable with an external headphone set;

keypad circuitry extended from the housing and coupled to the timer circuitry and indicator circuitry, the keypad circuitry including a plurality of switches with each switch selectively actuateable for placing the timing circuitry in one of the successive modes of operation; and a power cable having a proximal end coupled to the timer circuitry, indicator circuitry, and keypad circuity and a distal end coupleable with an external power supply for providing electrical energy to the circuitry for operation.

3. The sleep-preventing alarm as set forth in claim 2 wherein the coupling mechanism is a mounting bracket secured to the housing and with the mounting bracket including a plurality of mounting holes formed thereon and with each mounting hole adapted to receive a bolt.

4. The sleep-preventing alarm as set forth in claim 2 wherein the coupling mechanism is a mounting bracket secured to the housing and with the mounting bracket including a layer of adhesive applied thereto covered with a peel-off backing and with the backing removed for adhering the mounting bracket to a vehicle.

5. The sleep-preventing alarm as set forth in claim 2 wherein the characteristic time interval of a later mode of operation at least 30 seconds greater than the characteristic time interval of a former mode of operation.

6. The sleep-preventing alarm as set forth in claim 2 wherein the switches are back-lit and arranged in a sequential fashion to define a timing bar.

7. The sleep-preventing alarm as set forth in claim 2 wherein the keypad circuitry further includes a volume control mechanism and a tone control mechanism extended from the housing for controlling the volume and pitch of the audible alert transmitted by the speaker.

8. The sleep-preventing alarm comprising:

a hollow rigid housing;

a coupling mechanism for securing the housing to a motor vehicle;

timer circuitry disposed within the housing for transmitting a periodic indicator signal upon completion of a characteristic time interval in one of a number of successive modes of operation;

a lamp extended from housing for transmitting a visual alert upon receipt of a lamp indication signal;

a speaker extended from the housing for transmitting an audible alert upon receipt of a speaker activation signal;

indicator circuitry coupled to the timer circuitry, the speaker, and the lamp and with the indicator circuitry generating both a periodic lamp indication signal for a pre-determined amount of time and a periodic speaker activation signal for a pre-determined amount of time upon receipt of the indicator signal from the timer circuitry;

keypad circuitry extended from the housing and coupled to the timer circuitry and indicator circuitry, the keypad circuitry including a plurality of switches with each switch selectively actuateable for placing the timing circuitry in one of the successive modes of operation;

a power cable having a proximal end coupled to the timer circuitry, indicator circuitry, and keypad circuity and a distal end coupleable with an external power supply for providing electrical energy to the circuitry for operation;

a rotatable spring-loaded spool secured within the housing and including an actuateable spool switch engaged therewith and with the spool manually rotatable in one direction when a torquing force is applied thereto and automatically rotatable in an opposite direction upon activation of the switch; and wherein the power cable is wrapped around the spool and selectively manually payable therefrom and automatically retractable thereon.

* * * * *